(12) United States Patent
Crooks

(10) Patent No.: US 7,417,545 B1
(45) Date of Patent: Aug. 26, 2008

(54) METHOD OF DETERMINING FAILURE OF A COMMUNICATION BASE STATION

(75) Inventor: John F. Crooks, Duluth, GA (US)

(73) Assignee: NCR Corporation, Dayton, OH (US)

( * ) Notice: Subject to any disclaimer, the term of this patent is extended or adjusted under 35 U.S.C. 154(b) by 157 days.

(21) Appl. No.: 11/265,808

(22) Filed: Nov. 3, 2005

(51) Int. Cl.
*G08B 13/14* (2006.01)
*G06Q 10/00* (2006.01)

(52) U.S. Cl. .................. 340/572.1; 340/568.1; 705/28

(58) Field of Classification Search ... 340/568.1–572.9, 340/10.1–10.6, 500; 705/22, 28; 235/385, 235/449
See application file for complete search history.

(56) References Cited

U.S. PATENT DOCUMENTS

| | | | |
|---|---|---|---|
| 5,822,714 A * | 10/1998 | Cato | 702/108 |
| 6,150,934 A * | 11/2000 | Stiglic | 340/505 |
| 6,362,738 B1 * | 3/2002 | Vega | 340/572.1 |
| 7,002,473 B2 * | 2/2006 | Glick et al. | 340/572.1 |
| 7,042,360 B2 * | 5/2006 | Light et al. | 340/572.1 |
| 7,161,487 B1 * | 1/2007 | Tracey et al. | 340/572.1 |
| 2005/0040950 A1 * | 2/2005 | Clucas | 340/572.1 |
| 2006/0145859 A1 * | 7/2006 | Posamentier | 340/572.7 |
| 2006/0187042 A1 * | 8/2006 | Romer et al. | 340/572.1 |
| 2006/0244593 A1 * | 11/2006 | Nycz et al. | 340/572.1 |
| 2007/0008184 A1 * | 1/2007 | Ho et al. | 340/941 |
| 2007/0109099 A1 * | 5/2007 | Raphaeli et al. | 340/10.2 |

* cited by examiner

*Primary Examiner*—George A Bugg
*Assistant Examiner*—Jennifer Mehmood
(74) *Attorney, Agent, or Firm*—Paul W. Martin; Priest & Goldstein, PLLC

(57) ABSTRACT

A method of determining failure of a CBS.

31 Claims, 4 Drawing Sheets

METHOD OF DETERMINING FAILURE OF A COMMUNICATION BASE STATION

BACKGROUND OF THE INVENTION

Electronic shelf label (ESL) systems typically include a plurality of electronic displays, at least one for each item in a store. The electronic displays are coupled to a central server from where prices for all of the displays can be changed. In wireless ESL systems, the server may be coupled to communication base stations (CBSs) that wireless communicate with the ESLs.

If a CBS stops working, it may be days before anybody notices. Failure may be difficult to detect. Remote support personnel may be able to connect to the CBS and get basic diagnostic information, but in order to verify that the CBS can truly communicate with an ESL, support personnel must either call the customer or dispatch a field engineer to physically bring an ESL close to the CBS. This is slow, inconvenient, and costly.

Therefore, it would be desirable to provide a method of determining failure of a CBS.

SUMMARY OF THE INVENTION

A method of determining failure of a communication base station (CBS) is provided.

DETAILED DESCRIPTION OF THE PREFERRED EMBODIMENT

Figure 1:
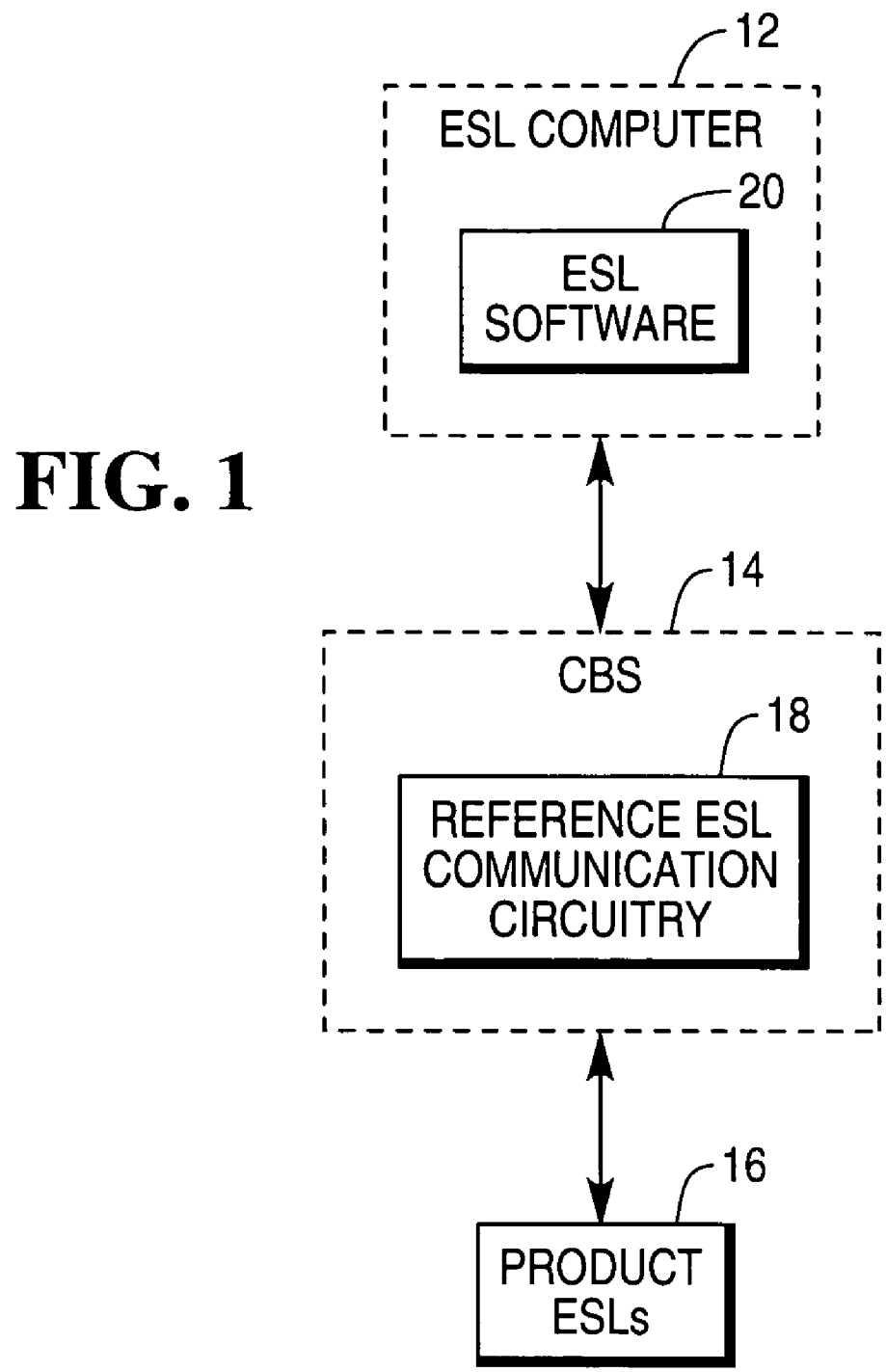
FIG. 1 is a block diagram of an electronic shelf label (ESL) system.

Referring now to FIG. 1, electronic shelf label (ESL) system 10 primarily includes ESL computer 12, communication base station (CBS) 14, product ESLs 16 and reference ESL communication circuitry 18.

ESL computer 12 executes ESL software 20, which controls price and other information displayed by product ESLs 16. ESL software 20 schedules messages for transmission to product ESLs 16 and reference ESL communication circuitry 18, and receives responses from product ESLs 16 and reference ESL communication circuitry 18. Finally, ESL software 20 maintains ESL identification information and corresponding display information in a data file.

CBS 14 wireless communicates with product ESLs 16 and reference ESL communication circuitry 18. For example, CBS 14 may communicate at RF frequencies. CBS 14 is coupled to ESL computer 12 through a cable connection.

ESL system 10 may include many CBSs 14. CBSs 14 are typically mounted to a ceiling and arranged to minimize gaps in communication coverage.

Product ESLs 16 are typically attached to shelves adjacent products. Product ESLs 16 display price and other promotional information associated with the products. reference ESL communication circuitry 18 is fixed in known proximity to CBS 14. For example, reference ESL communication circuitry 18 may be integrated into the housing of CBS 14, such as within the transmitter or antenna of CBS 14. Other locations with reading distance of CBS 14 are also envisioned. reference ESL communication circuitry 18 may also receive constant power through CBS 14, rather than be powered by a battery.

reference ESL communication circuitry 18 has its own address for receiving messages from CBS 14. This address may be stored within a memory of CBS 14, for example, at the time of manufacture for later diagnostic use.

In operation, CBS 14 receives price change and other messages from ESL computer 12 and sends the messages to product ESLs 16. CBS 14 may send the messages multiple times using polling techniques in order to ensure receipt of the messages by product ESLs 16. CBS 14 receives acknowledgment messages from product ESLs 16 and sends acknowledgment information to ESL computer 12.

CBS 14 also polls reference ESL communication circuitry 18 to ensure that CBS 14 is operating properly. If CBS 14 fails to respond after a predetermined number of attempts, CBS 14 or ESL computer 12 initiates a problem alert via Simple Network Management Protocol (SNMP), electronic mail (E-mail), server console popup message, error log, or other means.

CBS 14 or reference ESL communication circuitry 18 may contain circuitry for attenuating return signals if reference ESL communication circuitry 18 is located within or extremely close to CBS 14 and false positives occur due to direct coupling with internal circuitry in CBS 14. Attenuation may be variable to simulate various distances between reference ESL communication circuitry 18 and CBS 14.

Another method of determining whether CBS 14 is fully functional involves increasing attenuation of the return signal from reference ESL communication circuitry 18 until CBS 14 can no longer receive a reliable response. CBS 14 then compares this threshold attenuation value to a reference attenuation value established at the time of installation. If the two values are different, then CBS 14 or ESL computer 12 reports a problem.

Figure 2:
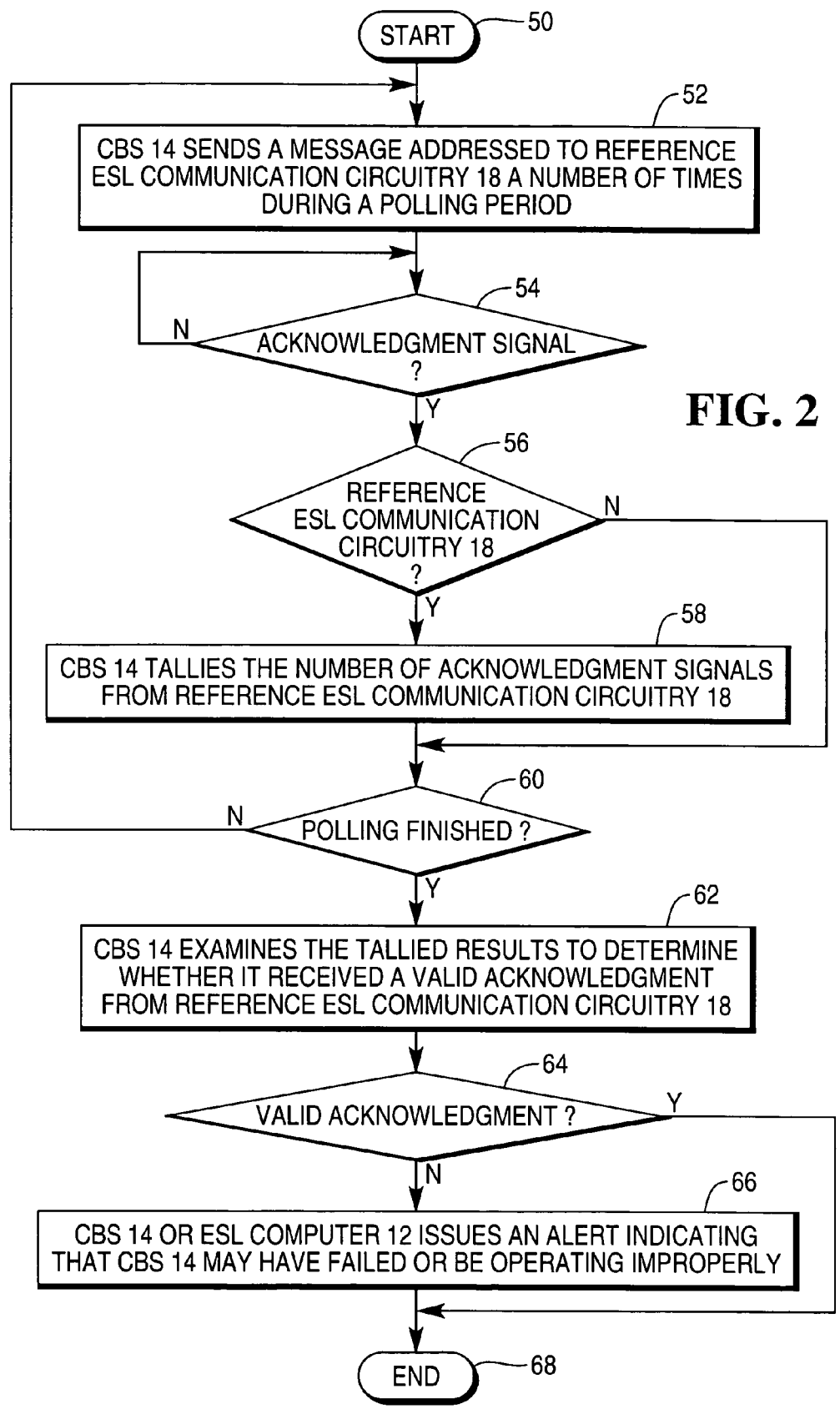
FIG. 2 is a flow diagram illustrating an example method of determining failure of a CBS.

In FIG. 2, an example method of determining a failure of CBS 14 is illustrated in more detail beginning with START 50.

In steps 52-60, CBS 14 completes a polling period looking for return signals from reference ESL communication circuitry 18.

In step 52, CBS 14 sends a message addressed to reference ESL communication circuitry 18.

In step 54, CBS 14 waits for an acknowledgment signal. If CBS 14 receives an acknowledgment signal, operation continues to step 56.

In step 56, CBS 14 determines whether the acknowledgment signal is from reference ESL communication circuitry 18. CBS 14 compares information in the acknowledgment signal to address information associated with reference ESL communication circuitry 18 stored in the memory of CBS 14. If so, operation proceeds to step 58. Otherwise, operation proceeds to step 60.

In step 58, CBS 14 tallies the number of acknowledgment signals from reference ESL communication circuitry 18. Operation continues to step 60.

In step 60, CBS 14 determines whether the polling period should end. An example polling period may loop through steps 52-60 about ten to twenty times in order to minimize false positives. If polling should continue, operation returns to step 52. Otherwise, operation continues to step 62.

In step 62, CBS 14 examines the tallied results to determine whether it received an acknowledgment from reference ESL communication circuitry 18. If so, operation ends at step 66.

Otherwise, operation continues at step 64.

In step 64, CBS 14 or ESL computer 12 issues an alert indicating that CBS 14 may have failed or be operating improperly. For example, CBS 14 may issue the alert via SNMP, E-mail, server console popup message, error log, or other means.

Operation ends at step 66.

Figure 3A:
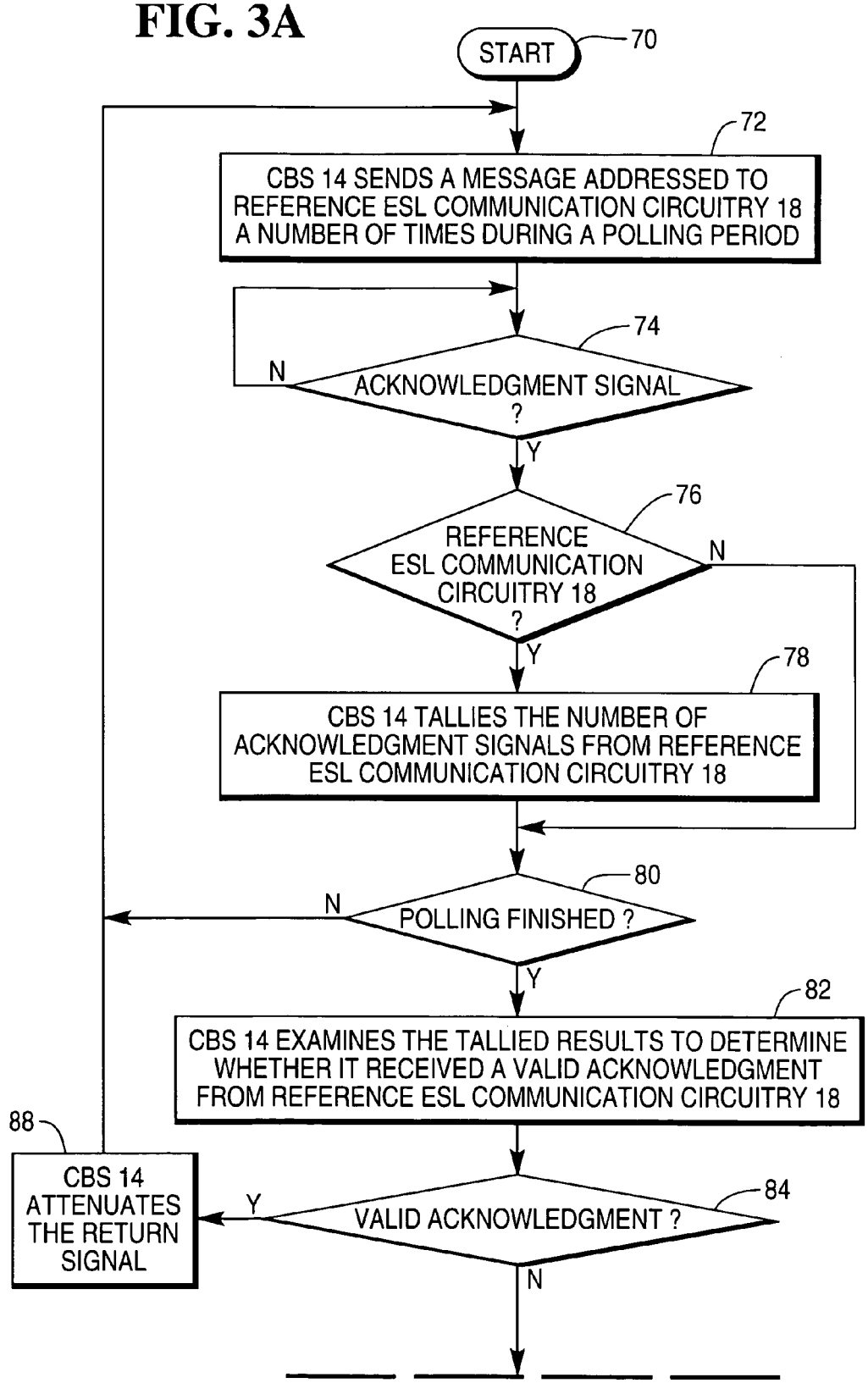
FIGS. 3A and 3B are a flow diagram illustrating another example method of determining failure of a CBS.
Figure 3B:
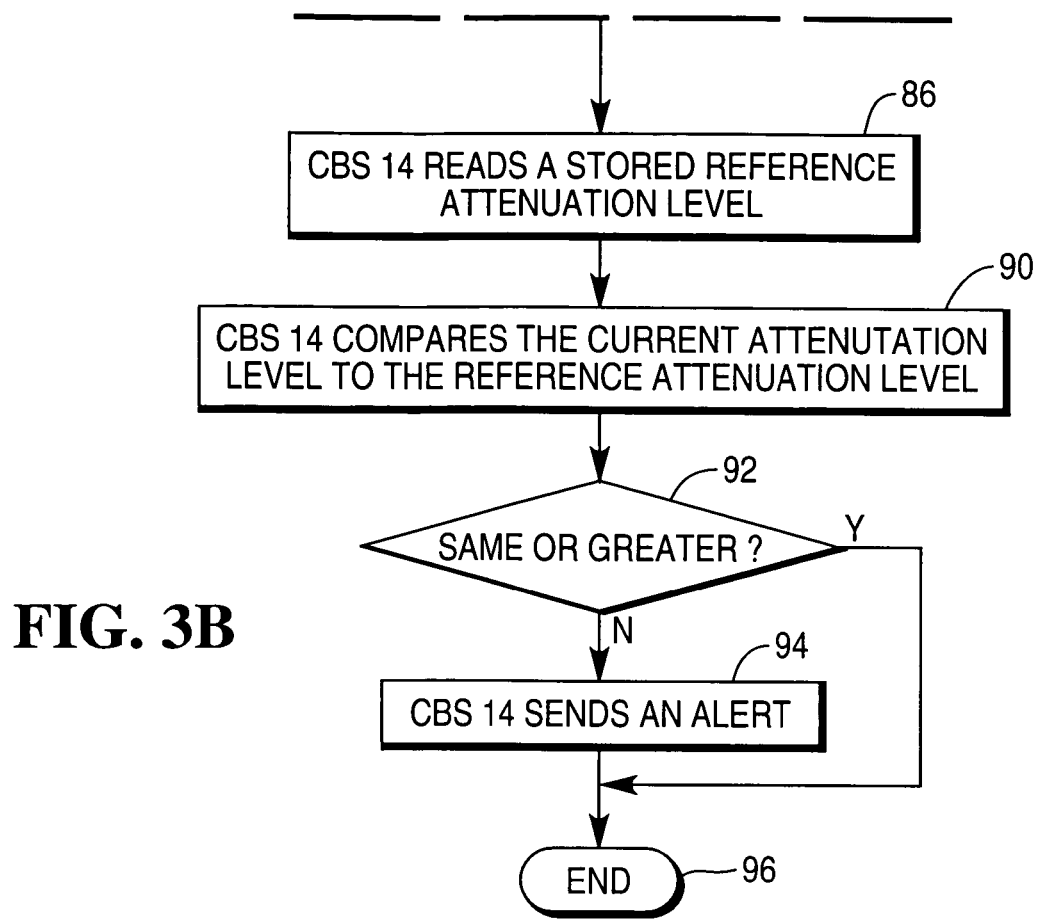

In FIG. 3, another example method of determining a failure of CBS 14 is illustrated in more detail beginning with START 70.

In steps 72-80, CBS 14 completes a polling period similar to the one in FIG. 2.

In step 72, CBS 14 sends a message addressed to reference ESL communication circuitry 18.

In step 74, CBS 14 waits for an acknowledgment signal from reference ESL communication circuitry 18. If CBS 14 receives an acknowledgment signal, operation continues to step 76.

In step 76, CBS 14 determines whether the acknowledgment signal is from reference ESL communication circuitry 18. CBS 14 compares information in the acknowledgment signal to address information associated with reference ESL communication circuitry 18 stored in the memory of CBS 14. If so, operation proceeds to step 78. Otherwise, operation proceeds to step 80.

In step 78, CBS 14 tallies the number of acknowledgment signals from reference ESL communication circuitry 18. Operation continues to step 60.

In step 80, CBS 14 determines whether the polling period should end. An example polling period may loop through steps 52-60 about ten to twenty times in order to minimize false positives. If polling should continue, operation returns to step 72. Otherwise, operation continues to step 82.

In step 82, CBS 14 examines the tallied results to determine whether it received an acknowledgment from reference ESL communication circuitry 18. If so operation continues to step 86. If not, operation continues at step 88.

In step 86, CBS 14 attenuates the acknowledgment signal. An example attenuation level is the current attenuation plus an additional attenuation of 3 dB. Operation returns to step 72 to continue polling. During successive polling periods, CBS 14 progressively attenuates the acknowledgment signal until it fails to receive a valid acknowledgment and operation proceeds to step 88.

In step 88, CBS 14 reads a stored reference attenuation level, which it obtained during a previous test.

In step 90, CBS 14 compares the current attenuation level to the reference attenuation level. If the current attenuation level is the same or greater than the reference attenuation level, operation ends at step 94. Otherwise, operation continues to step 92.

In step 92, CBS 14 or ESL computer 12 issues an alert indicating that CBS 14 may have failed. An attenuation level less than the reference attenuation level is an indication that CBS 14 is either not receiving a strong enough signal from reference ESL communication circuitry 18 or its receiver sensitivity is much lower due to failure.

In step 94, operation ends.

Although particular reference has been made to certain embodiments, variations and modifications are also envisioned within the spirit and scope of the following claims.

What is claimed is:

1. A method comprising:
   a) polling a known address associated with reference electronic shelf label (ESL) communication circuitry located adjacent to a communication base station (CBS) within communication range of the CBS, by the CBS; and
   b) issuing an alert to a computer indicative of a failure of the CBS if the CBS fails to receive a response including address information identifying the address associated with the reference ESL communication circuitry.

2. The method of claim 1, wherein step a) comprises:
   a-1) sending interrogation signals by the CBS;
   a-2) receiving return signals;
   a-3) determining first return signals received from the reference ESL communication circuitry;
   a-4) tallying a count of the first return signals.

3. The method of claim 2, wherein step a-3) comprises:
   a-3-A) comparing information in the return signals to reference information associated with the reference ESL communication circuitry and stored in a memory of the CBS.

4. The method of claim 1, wherein step b) comprises:
   b-1) issuing the alert via simple network management protocol.

5. The method of claim 1, wherein step b) comprises:
   b-1) issuing the alert via electronic mail.

6. The method of claim 1, wherein step b) comprises:
   b-1) issuing the alert via a server console popup message.

7. The method of claim 1, wherein step b) comprises:
   b-1) issuing the alert by adding an entry in an error log of the computer.

8. The method of claim 1, further comprising:
   c) attenuating return signals from the reference ESL communication circuitry.

9. The method of claim 8, wherein step c) comprises:
   c-1) varying attenuation to simulate various distances between the reference RFID ESL communication circuitry and the CBS.

10. The method of claim 8, wherein step c) comprises:
    c-1) increasing attenuation to a threshold attenuation level at which the CBS can no longer receive a reliable response from the reference ESL communication circuitry; and
    c-2) comparing the threshold attenuation level to a previously obtained reference attenuation level.

11. The method of claim 10, wherein step b) comprises:
    b-1) issuing the alert if the threshold attenuation level substantially differs from the reference attenuation level.

12. The method of claim 1, further comprising:
    c) disabling the reference ESL communication circuitry to prevent unwanted chatter after polling is finished.

13. The method of claim 1, further comprising:
    c) initiating step a) by a computer.

14. The method of claim 1, further comprising:
    c) initiating step a) by the CBS.

15. A system comprising:
    communication base station operative to send transmissions readable by electronic shelf label (ESL) communication circuitry and receive responses from ESL communication circuitry; and
    reference ESL communication circuitry located adjacent the communication base station (CBS) at a location known to be within communication range of the CBS if the CBS is operating normally;
    wherein the CBS polls the ESL communication circuitry by sending a transmission to a known address associated with the ESL communication circuitry, and issues an alert to a computer indicative of a failure of the CBS if the CBS fails to receive a response from the address associated with the ESL communication circuitry.

16. The system of claim 15, wherein the CBS comprises a housing and wherein the reference ESL communication circuitry is located within the housing.

17. The system of claim 15, wherein the CBS sends interrogation signals, receives return signals, determines first return signals received from the reference ESL communication circuitry, and tallies a count of the first return signals during polling.

18. The system of claim 17, wherein the CBS compares information in the return signals to reference information associated with the reference ESL communication circuitry and stored in a memory of the CBS to determine the first return signals.

19. The system of claim 15, wherein the CBS issues the alert via simple network management protocol.

20. The system of claim 15, wherein the CBS issues the alert via electronic mail.

21. The system of claim 15, wherein the CBS issues the alert via a server console popup message.

22. The system of claim 15, wherein the CBS issues the alert by adding an entry in an error log of the computer.

23. The system of claim 15, wherein the CBS attenuates return signals from the reference ESL communication circuitry.

24. The system of claim 23, wherein the CBS varies attenuation to simulate various distances between the reference ESL communication circuitry and the CBS.

25. The system of claim 23, wherein the CBS increases attenuation to a threshold attenuation level at which the CBS can no longer receive a reliable response from the reference ESL communication circuitry, compares the threshold attenuation level to a previously obtained reference attenuation level.

26. The system of claim 24, wherein the CBS issues the alert if the threshold attenuation level substantially differs from the reference attenuation level.

27. The system of claim 15, wherein the reference RFID label attenuates return signals from the reference ESL communication circuitry.

28. The system of claim 27, further comprising a wireless communicator for controlling the reference ESL communication circuitry.

29. The system of claim 15, wherein the CBS disables the reference ESL communication circuitry to prevent unwanted chatter after polling is finished.

30. The system of claim 15, wherein the CBS initiates polling.

31. The system of claim 15, wherein the computer initiates polling.

* * * * *

UNITED STATES PATENT AND TRADEMARK OFFICE
CERTIFICATE OF CORRECTION

PATENT NO. : 7,417,545 B1 Page 1 of 1
APPLICATION NO. : 11/265808
DATED : August 26, 2008
INVENTOR(S) : J. F. Crooks It is certified that error appears in the above-identified patent and that said Letters Patent is hereby corrected as shown below:

Column 4 Line 31, after "reference" delete "RFID"

Signed and Sealed this

Twenty-sixth Day of May, 2009

JOHN DOLL
*Acting Director of the United States Patent and Trademark Office*